United States Patent
Rivera et al.

(10) Patent No.: US 7,484,221 B2
(45) Date of Patent: Jan. 27, 2009

(54) METHOD AND APPARATUS FOR LOGGING THE EXECUTION HISTORY OF AN OPERATING SYSTEM KERNEL

(75) Inventors: Jose German Rivera, Sunnyvale, CA (US); Lillian Chou, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 10/970,480

(22) Filed: Oct. 20, 2004

(65) Prior Publication Data

US 2006/0085691 A1 Apr. 20, 2006

(51) Int. Cl.
 *G06F 9/46* (2006.01)
 *G06F 9/44* (2006.01)

(52) U.S. Cl. ............... 719/318; 719/310; 717/130; 717/131

(58) Field of Classification Search ........... 719/318, 719/310; 717/130–131
 See application file for complete search history.

(56) References Cited

U.S. PATENT DOCUMENTS

| | | | | |
|---|---|---|---|---|
| 5,737,521 A * | 4/1998 | Kleber et al. | ................. | 714/45 |
| 6,226,784 B1 * | 5/2001 | Holmes et al. | ............. | 717/100 |
| 6,282,701 B1 * | 8/2001 | Wygodny et al. | ............ | 717/125 |
| 6,539,341 B1 * | 3/2003 | Li et al. | ................... | 702/187 |
| 6,961,874 B2 * | 11/2005 | Lodrige | ................... | 714/38 |
| 7,051,096 B1 * | 5/2006 | Krawiec et al. | ............. | 709/223 |
| 7,146,473 B1 * | 12/2006 | Cantrill | .................... | 711/156 |
| 7,174,557 B2 * | 2/2007 | Sanghvi et al. | ............. | 719/318 |
| 2003/0192036 A1 * | 10/2003 | Karkare et al. | ............. | 717/158 |
| 2004/0244011 A1 * | 12/2004 | Morris et al. | ............... | 719/318 |
| 2004/0267668 A1 * | 12/2004 | Aissi | ........................... | 705/50 |
| 2005/0055605 A1 * | 3/2005 | Blumenthal et al. | .......... | 714/13 |
| 2005/0114839 A1 * | 5/2005 | Blumenthal et al. | ........ | 717/124 |

OTHER PUBLICATIONS

Williams, Mickey. Microsoft® Visual C#TM .NET (Core Reference). Microsoft Press, 2002.*
Zhou et al., "Tracing Windows95", Elsevier Science, 2000, pp. 1-15.*
Lorch et al., "Buliding Vtrace, A Tracer for Windows NT and Windows 2000", EECS, 2000, pp. 1-18.*

* cited by examiner

Primary Examiner—Meng-Ai An
Assistant Examiner—Jennifer N To (57) ABSTRACT

Disclosed herein are a method and apparatus for logging the execution history of an operating system kernel by including an event description in a production image of the kernel. A command is received in order to enable an event description. The event description is enabled according to the command while the operating system kernel is executing. A description of an event is logged in an event log when the event occurs and when the event is enabled.

21 Claims, 7 Drawing Sheets

METHOD AND APPARATUS FOR LOGGING THE EXECUTION HISTORY OF AN OPERATING SYSTEM KERNEL

BACKGROUND

An operating system is a computer program that is executed by one or more processors. The purpose of an operating system is to control the utilization of resources in a computer system. An operating system generally includes various functional modules, each of which is implemented as an instruction sequence that can be executed by the one or more processors. Each such functional module, when executed by the processor, minimally causes the processor to perform some function integral to the operating system.

An operating system typically includes functional modules for performing various activities including, but not limited to allocating processing resources to a task, controlling peripheral devices communicatively coupled to one or more processors and storage and retrieval of information using files. Files are typically managed by an operating system by controlling the placement of information on computer readable medium.

An operating system is typically developed using well-known methods for the development of software. Using existing software development methods, functional modules are independently tested against requirements specifications. Once the individual functional modules are tested, they are integrated together to form a complete operating system. The complete operating system is then tested to ensure proper operation.

During development, the various individual functional modules undergo testing at various levels. For example, in the early stages of development a functional module may include event descriptions. When a particular event is detected in a functional module, the record is typically made of the event. The event record of this type is useful in identifying anomalies that may be present in the design of a functional module. Once a particular functional module is fully tested and subsequently validated, common wisdom dictates that event descriptions included in the functional module for the purposes of identifying anomalies are no longer necessary. As such, an event description included in a functional module represents superfluous code.

Even after a particular functional module has been validated, additional anomalous conditions may eventually arise. For example, a particular functional module may not be exhaustively validated against a set of functional requirements. In this case, a validated functional module may behave erratically when it is subject to a particular use scenario. In this situation, there is little hope in identifying the cause of an anomaly because the event descriptions used to identify anomalous behavior in the functional module are eliminated prior to the creation of production software images that comprise the operating system.

SUMMARY

Disclosed herein are a method and apparatus for logging the execution history of an operating system kernel by including an event description in a production image of the kernel. A command is received in order to enable an event description. The event description is enabled according to the command while the operating system kernel is executing. A description of an event is logged in an event log when the event occurs and when the event is enabled.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
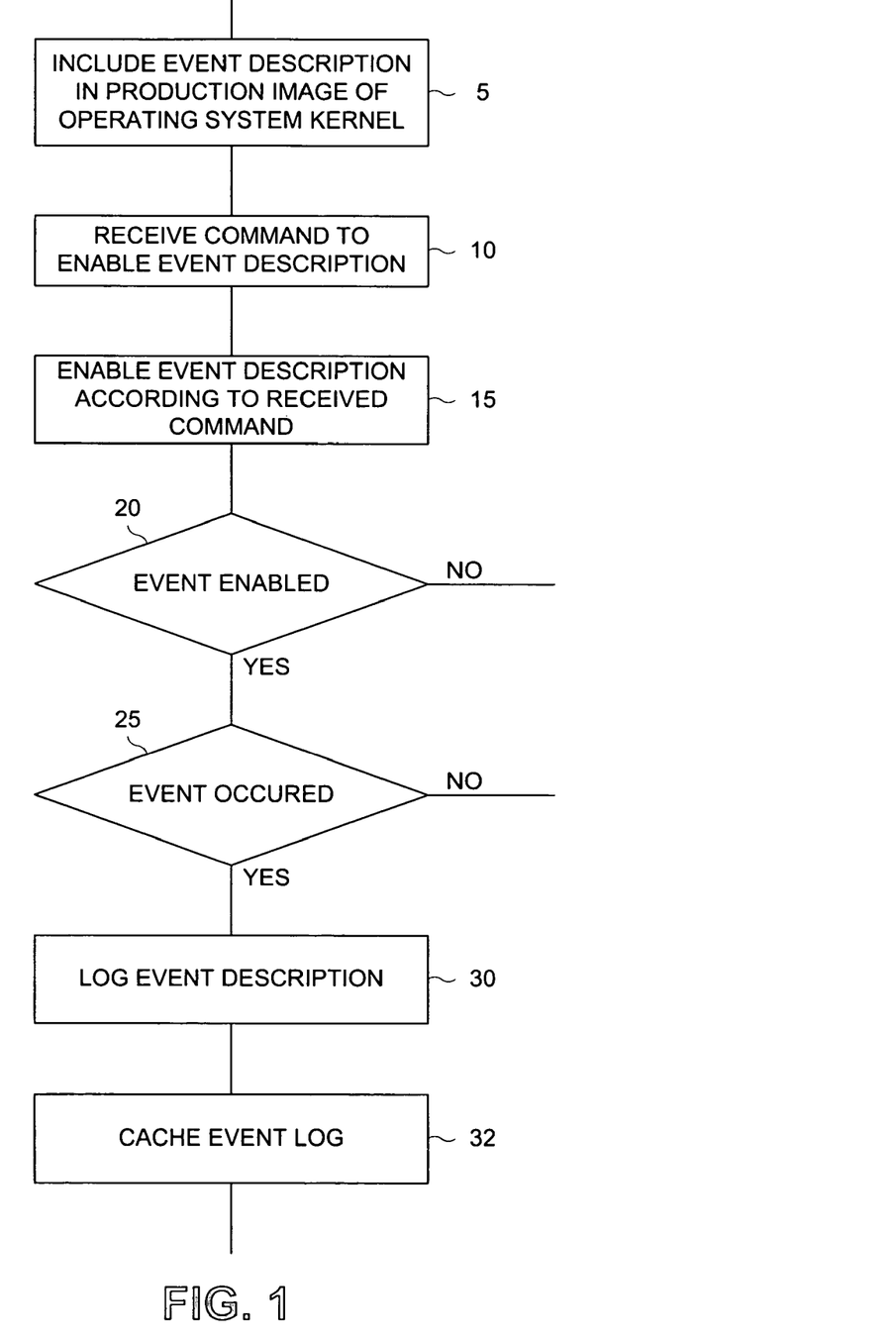
FIG. 1 is a flow diagram that depicts one example method for logging the execution history of an operating system kernel.

FIG. 1 is a flow diagram that depicts one example method for logging an execution history of an operating system kernel. According to this example method, an event description is included in a production image of the operating system kernel (step 5). The production image of the operating system kernel is then allowed to execute. As the production image of the operating system kernel is executed by a processor, a command to enable an event description is received (step 10). Once the command to enable an event is received, a particular event description is enabled according to the received command (step 15).

In furtherance of the present method, when an event occurs (step 20) a determination is made as to whether or not the event is enabled (step 25). When the event is enabled (step 25), a description of the event is logged (step 30) when such event occurs. According to one variation of the present method, an event log, which is used to store individual recordings of event descriptions, is cached (step 32). Typically, the event log is cached when the event log reaches a pre-established fill level.

One distinguishing characteristic of the present method is that of receiving a command to enable an event description while an operating system kernel is being executed by a processor. By enabling an event description in response to received command, normal operation of the operating system kernel can continue. According to one variation of the present method, the command to enable an event pertains to an event description for a component included in an operating system kernel. According to another variation of the present method, the command to enable an event pertains to an object included in a component included in an operating system kernel.

Figure 2:
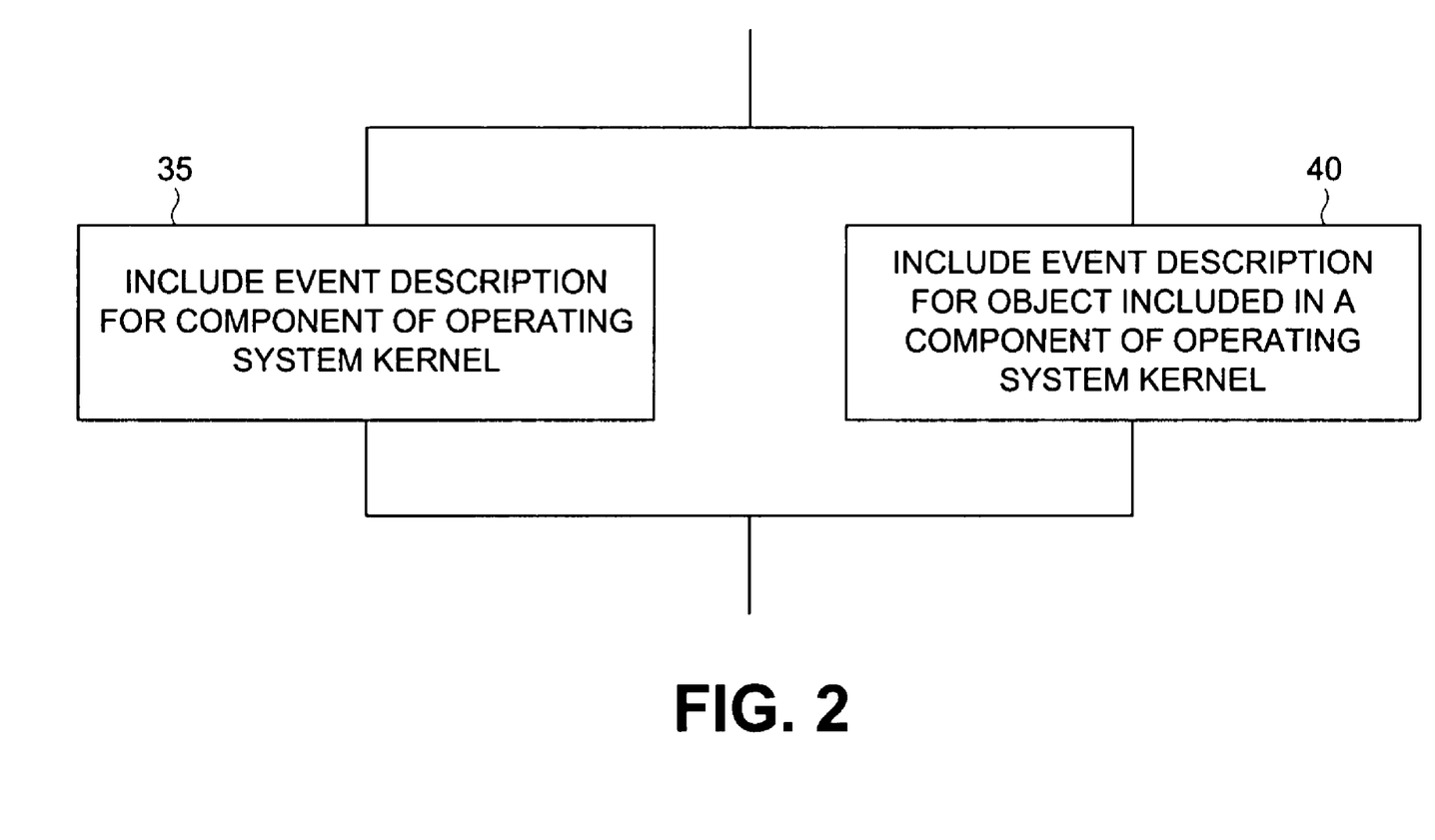
FIG. 2 is a flow diagram that depicts alternative illustrative methods for including an event description in a production image of an operating system kernel.

FIG. 2 is a flow diagram that depicts alternative illustrative methods for including an event description in a production image of an operating system kernel. According to one variation of the present method, an event description for a component included in the operating system kernel is included (step 35) in the production image of the operating system kernel. According to yet another variation of the present method, an event description for an object included in a component included in the operating system kernel is included (step 40) in the production image of the operating system kernel. Accordingly, each type of event description included in a production image of an operating system kernel can be independently enabled by means of received commands commensurate with the teachings of the present method.

Figure 3:
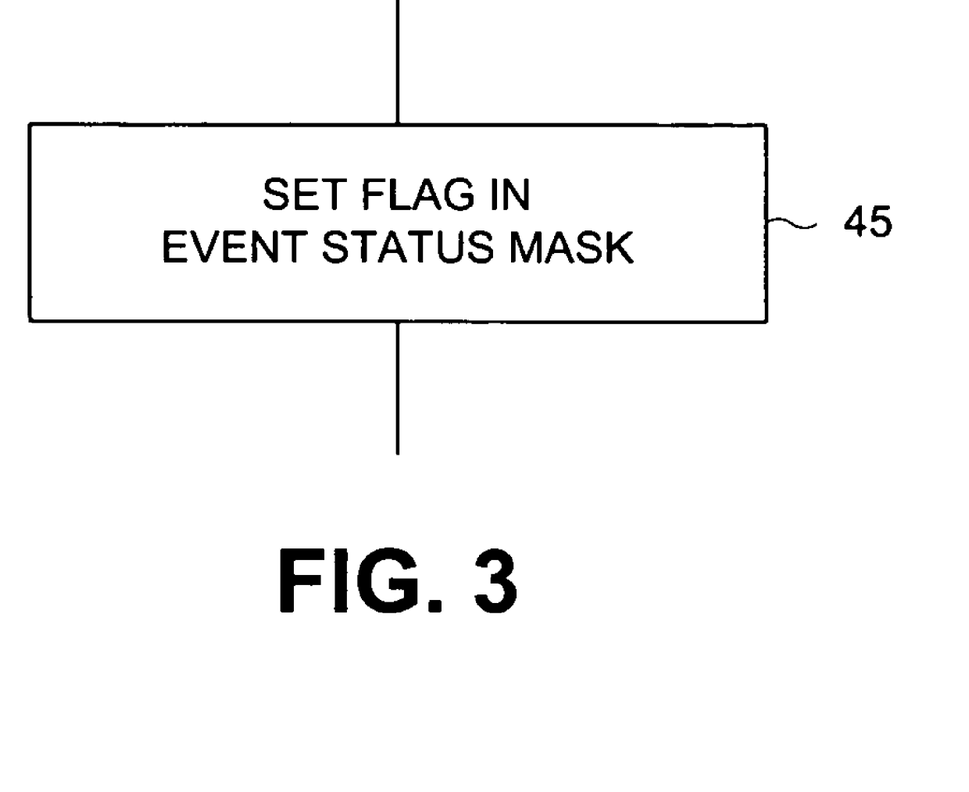
FIG. 3 is a flow diagram that depicts one alternative example method for enabling an event description.

FIG. 3 is a flow diagram that depicts one alternative example method for enabling an event description. According to this alternative example method, an event description is enabled by setting a flag in an event status mask (step 45). Typically, this is accomplished by setting a flag in a table where the table comprises a collection of one or more event status masks for a collection of one or more corresponding event descriptions.

Figure 4:
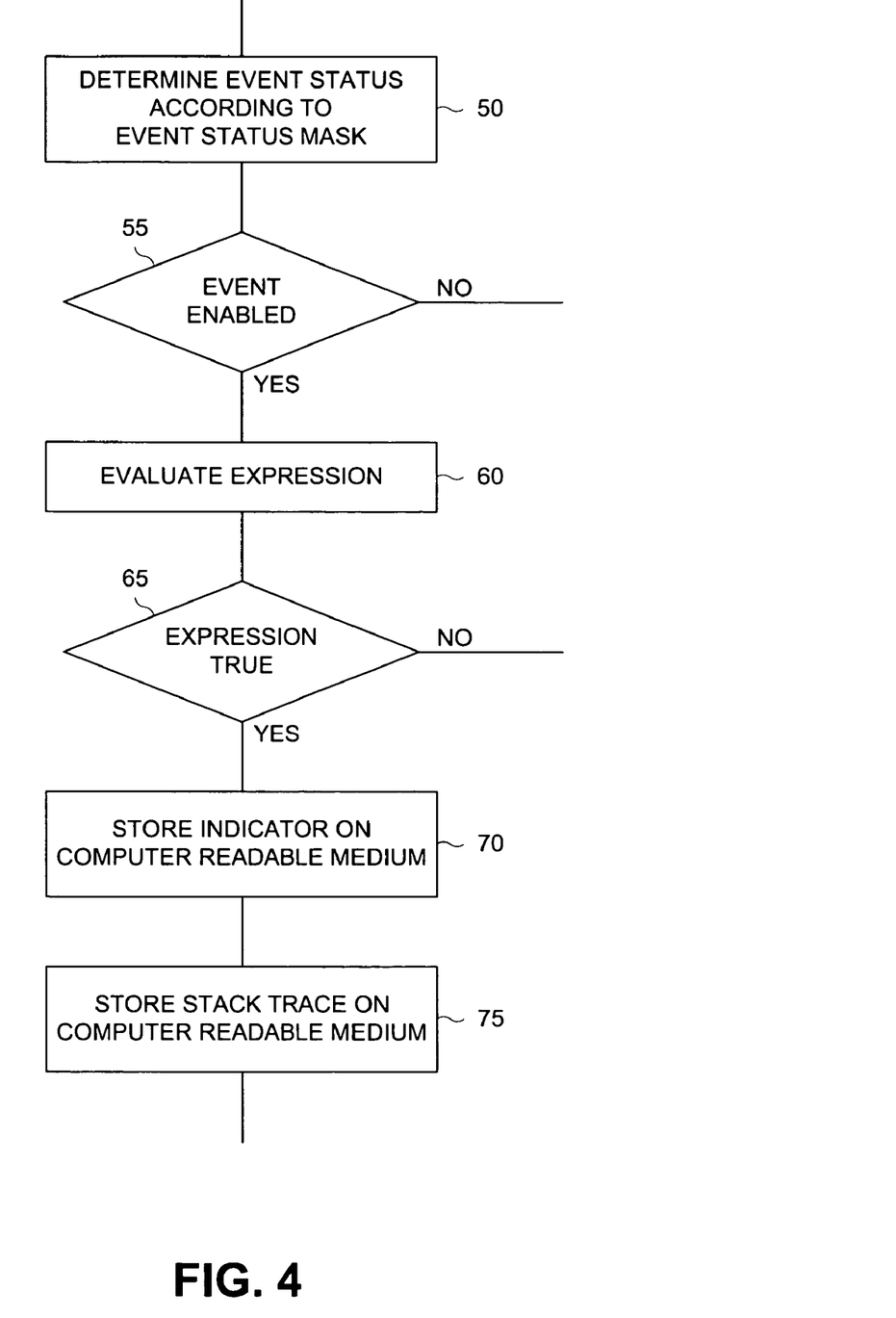
FIG. 4 is a flow diagram that depicts one alternative example method for logging an event description when an event occurs.

FIG. 4 is a flow diagram that depicts one alternative example method for logging an event description when an event occurs. According to this alternative example method, a determination of whether or not an event is enabled is accomplished by determining event status according to an event status mask (step 50). When the event is enabled (step 55), an expression associated with the event description is evaluated (step 60). An indicator is then stored on computer readable medium (step 70) when the expression evaluates to a true value (step 65). According to one variation of the present method, the indicator is stored in a circular buffer maintained in the computer readable medium. According to yet another alternative illustrative method, a stack trace associated with the event description is also stored on computer readable medium (step 75). Generally, a stack trace is associated with an event description as a result of a temporal associativity. That is to say, the stack trace that exists at a time when a particular event description occurs and is enabled is the stack trace that is associated with that particular event description.

Figure 5:
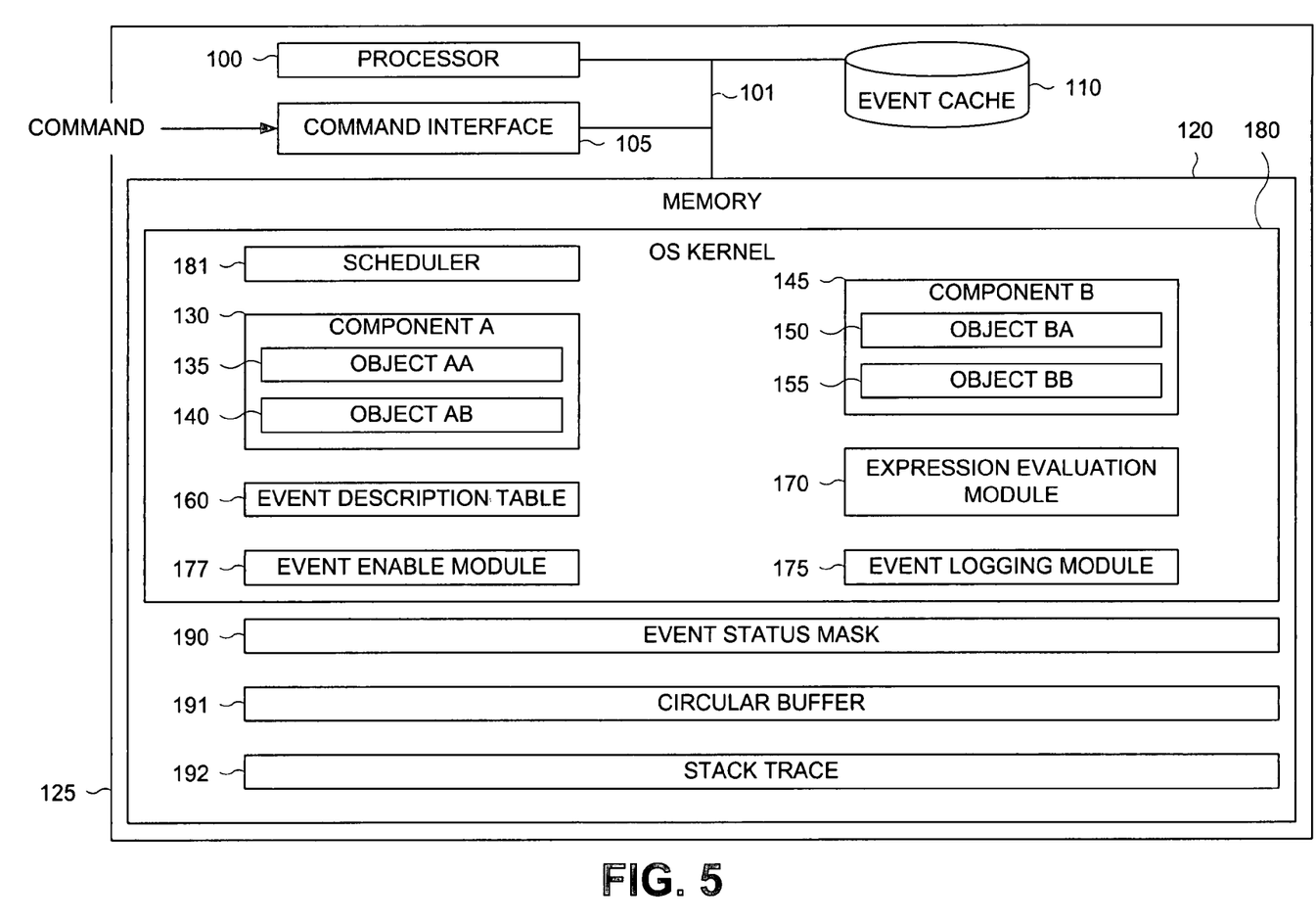
FIG. 5 is a block diagram of one example embodiment of a system for executing a computer program.

FIG. 5 is a block diagram of one example embodiment of a system for executing a computer program. According to this example embodiment, a system for executing a computer program comprises one or more processors 100, a command interface 105, a memory 120 and an operating system kernel 180 stored in the memory 120. The aforementioned hardware elements are communicatively associated with each other by means of a bus 101. An operating system kernel is often referred to simply as a kernel 180. The memory 120, according to various alternative embodiments, is also used to store an event status mask 190. According to other various alternative embodiments, the memory 120 is also used to store a stack trace 192. The memory 120 comprises a computer readable medium that is also used to store an event log. According to one alternative embodiment, the event log is managed as a circular buffer 191 stored in the memory 120.

According to this example embodiment, the kernel 180 includes an event description table 160 and further comprises one or more functional modules stored in the memory 120. A functional module comprises an instruction sequence that is executed by one or more processors 100. As the processor 100 executes a particular instruction sequence, it performs certain functions commensurate with the teachings of the present method. The reader is advised that the term "minimally causes the processor" and variants thereof is intended to serve as an open-ended enumeration of functions performed by the processor 100 as it executes a particular functional module (i.e. instruction sequence). As such, an embodiment where a particular functional module causes the processor 100 to perform functions in addition to those defined in the appended claims is to be included in the scope of the claims appended hereto.

The functional modules (and their corresponding instruction sequences) described thus far enable execution of a computer program in accordance with the teachings of the present method. According to one illustrative embodiment, these functional modules are imparted onto computer readable medium. Examples of such medium include, but are not limited to, random access memory, read-only memory (ROM), Compact Disk (CD ROM), Digital Versatile Disks (DVD), hard disk drives, floppy disks, and magnetic tape. This computer readable medium, which alone or in combination can constitute a stand-alone product, can be used to convert a general-purpose computing platform into a device capable of executing a computer program according to the techniques and teachings presented herein. Accordingly, the claims appended hereto are to include such computer readable medium imparted with such instruction sequences that enable execution of the present method and all of the teachings afore described.

According to this example embodiment, the kernel 180 comprises one or more functional modules including a scheduler 181, an event enable module 177 and an event logging module 175. According to one alternative embodiment, the kernel 180 further comprises an expression evaluation module 170. In operation, the scheduler 181, when executed by the processor 100, minimally causes the processor 100 to execute a user application. According to one illustrative use case, a user application is stored in the memory 120. According to yet another alternative embodiment, the scheduler 181, when executed by the processor 100, minimally causes the processor 100 to execute a component included in the kernel 180. A component included in the kernel, according to one alternative embodiment, includes at least one object. For example, as depicted in the figure, the kernel 180 can include a first component 130 (component A). This first component 130 can itself include at least one object 135 and potentially a second object 140; objects AA and AB, respectively. In yet another example, the kernel 180 can include a second component 145 (component B). This second component 145 can itself include at least one object 150 and potentially a second object 155; objects BA and BB, respectively. It should be appreciated that the structure of various components and their subordinate objects included in a kernel and as depicted in the figure are intended to illustrate one illustrative embodiment and are not intended to limit the scope of the claims appended hereto. Such components and objects can include various types of functional modules that, when executed by a processor, minimally cause the processor 100 to perform functions including, but not limited to allocating processing resources to an application, controlling a peripheral devices attached to the bus 101 and managing information on a computer readable medium (e.g. an event cache) 110.

Figure 6:
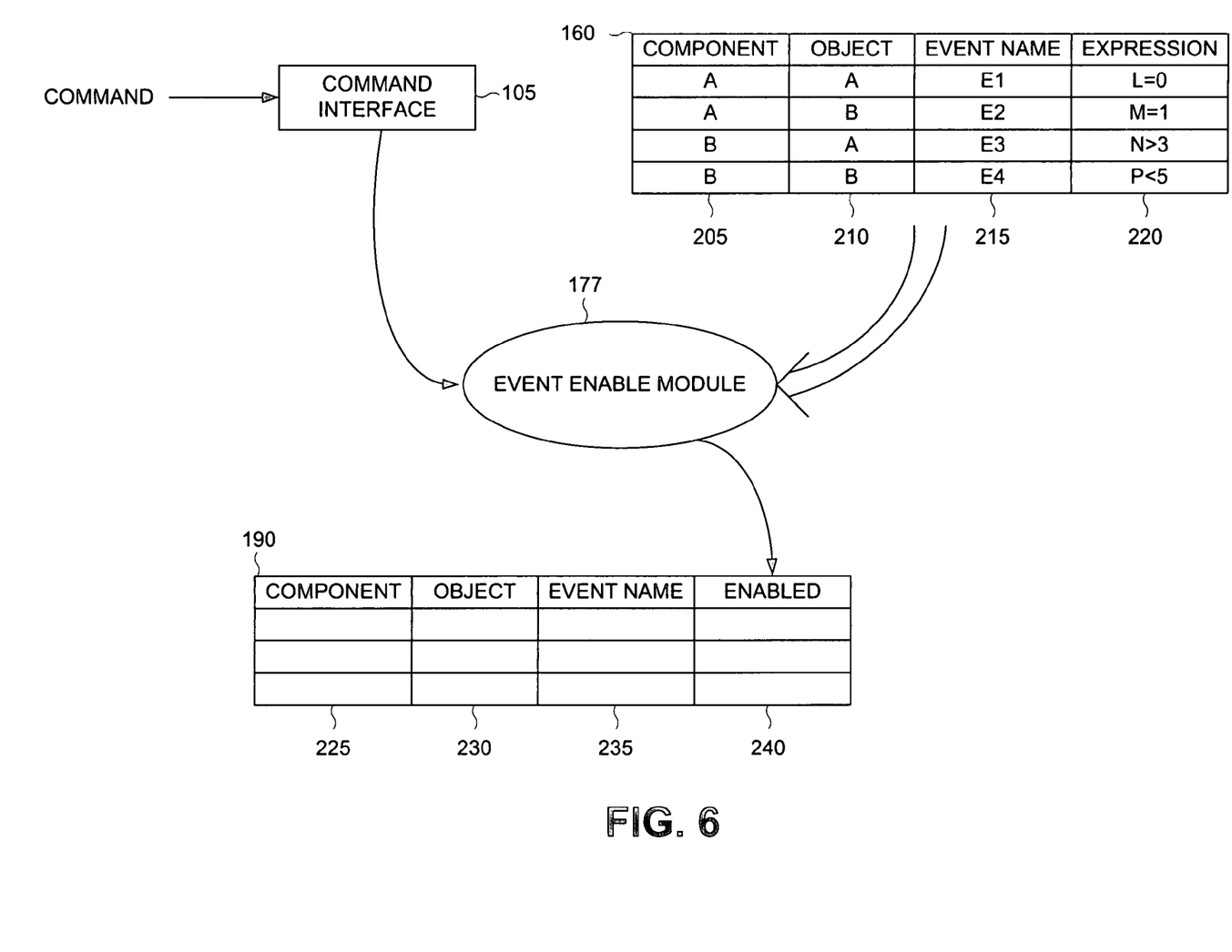
FIGS. 6 and 7 collectively comprise a data flow diagram that depicts the internal operation of one example embodiment of a system for executing a computer program.
Figure 7:
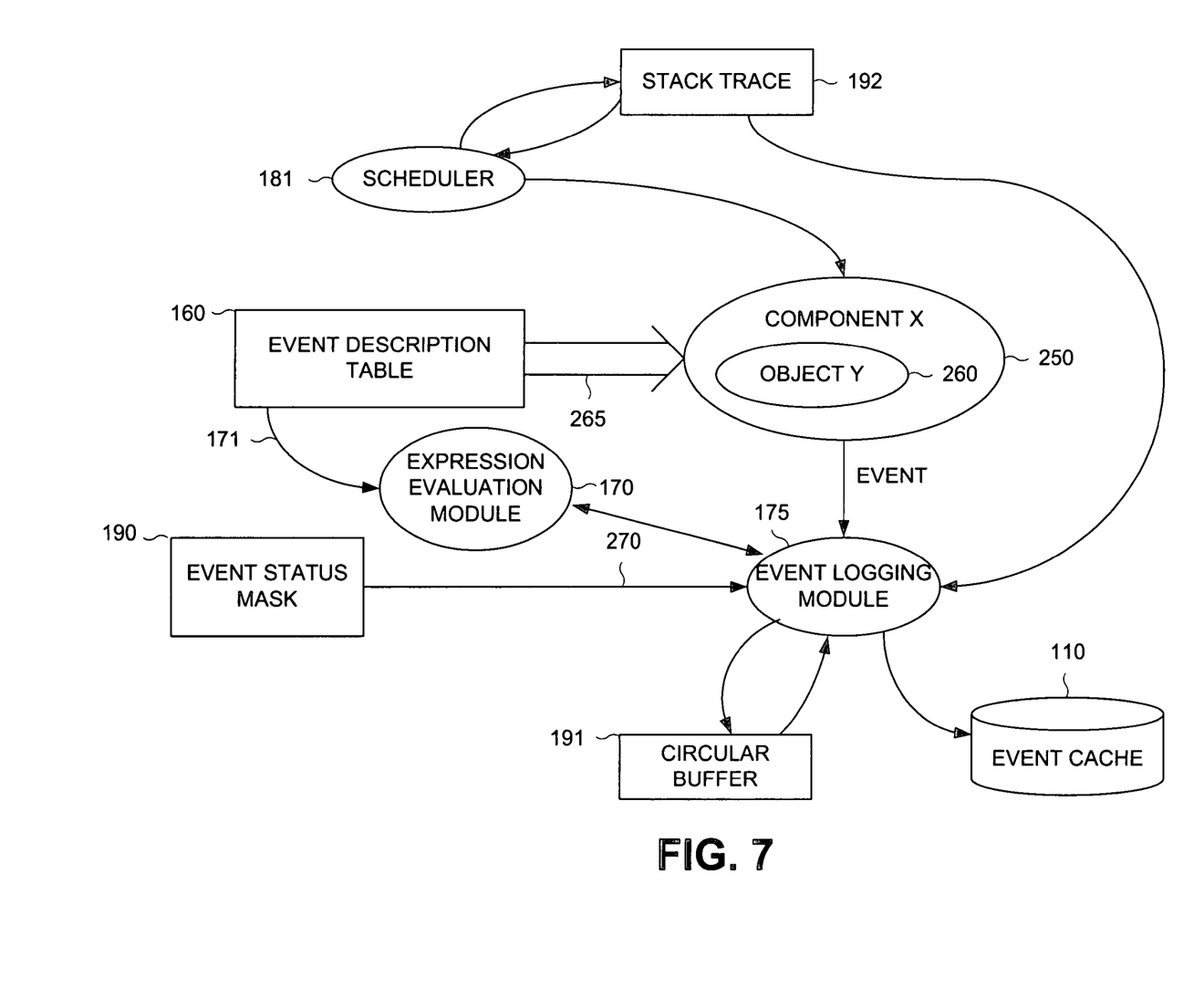

FIGS. 6 and 7 collectively comprise a data flow diagram that depicts the internal operation of one example embodiment of a system for executing a computer program. According to this example embodiment, the event enable module 177, when executed by the processor 100, minimally causes the processor 100 to receive an event enable command by means of the command interface 105. The event enable module 177, when executed by the processor 100, further minimally causes the processor 100 to enable a particular event description according to the event enable command received by means of the command interface 105. The event logging module 175, when executed by the processor 100, minimally causes the processor 100 to log a description of the kernel event when the kernel event occurs in when the kernel event is enabled.

FIG. 6 further illustrates that the kernel 180 includes an event description table 160. According to one alternative embodiment, the event description table 160 includes one or more records for storing event descriptions. Each record includes a component identifier field 205. In one alternative embodiment, the event description table 160 also includes an object identifier field 210. The component identifier field 205 is used to identify a particular event, the name of which is stored in an event name field 215, for a particular component 205 included in the kernel 180. The component identifier field 205, according to one alternative embodiment, is used in conjunction with a value stored in the object field 210 in order to identify a particular event for a particular object included in a particular component included in the kernel 180. According to yet another alternative embodiment, each record stored in the event description table 160 further includes an expression which is stored in an expression field 220. Typically, the expression stored in the expression field 220 is associated with a particular event defined in a record stored in the event description table 160. As presented in the figure for illustration purposes only, a first component "A" includes a first object "A" that has associated with it an event named "E1". The event named "E1" has associated with an expression "L=0". It should be appreciated that any component names, object names, event names and expressions illustrated in the figure are presented for illustrative purposes only and are not intended to limit the scope of the claims appended hereto.

According to yet another alternative embodiment, the event enable module 177, when executed by the processor 100, minimally causes the processor 100 to establish and maintain in the memory 120 an event status mask 190. According to yet another alternative embodiment, the event status mask 190 is organized as one or more records wherein each record includes a component field 225 and an event name field 235. In this alternative embodiment, the processor 100, as it continues to execute the event enable module 177, will select a record in the event status mask 190 according to values stored in the component field 225 and the event name field 235. In yet another alternative embodiment, a record stored in the event status mask 190 further includes an object field 230. In this alternative embodiment, the processor 100, as it continues to execute the event enable module 177, further uses a value stored in the object field 230 as an additional selection criteria for a record stored in the event status mask 190. Once a record is selected, the processor 100, as it continues to execute one alternative embodiment of an event enable module 177, is further minimally caused to set a flag according to an event enable command received from the command interface 105. The flag is set in a selected record in a field called enabled 240, which is also included in the event status mask 190.

FIG. 7 illustrates that, according to one alternative example embodiment, the scheduler 181, when executed by the processor 100, minimally causes the processor to execute a particular component (e.g. component X 250) included in the kernel 180. In yet another example embodiment, the scheduler 181 minimally causes the processor 100 to execute an object (e.g. object Y 260) included in a component that is included in the kernel 180. As the object or the component included in an object is executed, the processor 100 is minimally caused to consult 265 the event description table 160 included in the kernel 180. As the processor 100 consults the event description table, it determines when an event occurs and generates an event signal. The processor 100 then executes the event logging module 175. When executed by the processor 100, one alternative embodiment of the event logging module 175 minimally causes the processor 100 to determine if an event is enabled by consulting 270 the event status mask 190. According to this alternative embodiment, the event logging module 175 further minimally causes the processor 100 to execute the expression evaluation module 170. The expression evaluation module 170, when executed by the processor 100, minimally causes the processor to retrieve (171) from the event description table 160 an expression for an enabled event and to evaluate the expression. The event logging module 175 further minimally causes the processor 100 to store an indicator in a computer readable medium when the expression evaluates to a true value. According to yet another alternative embodiment, the event logging module 175 causes the processor to store an indicator in computer readable medium by minimally causing the processor 100 to store an indicator in a circular buffer 191 maintained in the memory 120.

According to yet another alternative example embodiment, the event logging module further minimally causes the processor 100 to store a stack trace 192 in the computer readable medium in addition to an event description. The stack trace 192 is generally maintained by the processor 100 as it executes the scheduler, or any other module that has been allocated processing resources. In at least one alternative embodiment, the stack trace 192 that is stored corresponds to at least one of an executing component included in the kernel 180 and an executing object included in a component included in the kernel 180.

In yet another alternative embodiment, the event logging module 175, when executed by the processor 100, further minimally causes the processor 100 to cache an event log maintained in the computer readable medium when the number of event descriptions stored in the event log reaches a pre-established threshold. The event cache 110, according to one embodiment of the system, comprises Recordable Compact Disk, Recordable Digital Versatile Disks (DVD), hard disk drives, floppy disks and magnetic tape.

While the present method and apparatus has been described in terms of several alternative methods and exemplary embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for logging an execution history of an operating system kernel comprising:
   including an event description in a production image of the operating system kernel;
   enabling the event description in the operating system kernel according to a command received by the operating system kernel to enable an event description with respect to a particular component of the operating system kernel while the operating system kernel is executing, wherein enabling the event description comprises setting a flag in an event status mask while the operating system kernel is executing; and
   logging a description of the event in an event log when the event occurs and also when the event is enabled.

2. The method of claim 1 wherein including an event description comprises at least one of including an event description for a component of an operating system kernel and including an event description for an object included in a component of an operating system kernel.

3. The method of claim 1 further comprising caching the event log when the event log reaches a pre-established fill level.

4. A method for logging an execution history of an operating system kernel comprising:

including an event description in a production image of the operating system kernel;

enabling the event description in the operating system kernel according to a command received by the operating system kernel to enable an event description with respect to a particular component of the operating system kernel while the operating system kernel is executing; and logging a description of the event in an event log when the event occurs and also when the event is enabled, wherein logging a description of an event comprises:

determining if the event is enabled according to an event status mask;

evaluating an expression that describes the event when the event is enabled; and storing an indicator in a computer readable medium when the expression is evaluated to true value.

5. The method of claim 4 wherein storing an indicator comprises storing an indicator in a circular buffer.

6. The method of claim 4 further comprising storing a stack trace in the computer readable medium.

7. A system for executing a computer program comprising:
one or more processors capable of executing an instruction sequence;
command interface capable of receiving an event enable command;
memory capable of storing one or more instruction sequences; and
kernel stored in the memory that includes a kernel event description and further comprising one or more instruction sequences including:
scheduler that, when executed by the processor, minimally causes the processor to execute at least one of a user application, a component included in the kernel and an object included in a component included in the kernel;
event enable module that, when executed by the processor, minimally causes the processor to receive an event enable command by means of the command interface and further minimally causes the processor to enable a kernel event in the kernel with respect to a particular component of the kernel according to the event enable command; and
event logging module that, when executed by the processor, minimally causes the processor to log a description of the kernel event when the kernel event occurs and when the kernel event is enabled, wherein the event logging module causes the processor to enable a kernel event by minimally causing the processor to set a flag in an event status mask stored in the memory.

8. The system of claim 7 wherein the kernel event description comprises at least one of an event description for a component included in the kernel or an event description for an object included in a component included in the kernel.

9. The system of claim 7 wherein the kernel further comprises an expression evaluation module that, when executed by the processor, minimally causes the processor to evaluate an expression associated with an event and wherein the event logging module causes the processor to log an event by minimally causing the processor to:

determine the enable status of an event according to an event status mask stored in the memory; execute the expression evaluation module for an expression associated with an event when the event is enabled; and store an indicator in the memory when the expression evaluates to a true value.

10. The system of claim 9 wherein the event logging module causes the processor to store an event indicator in the memory by minimally causing the processor to store an indicator in a circular buffer.

11. The system of claim 9 wherein the event logging module, when executed by the processor, further minimally causes the processor to store a stack trace corresponding to at least one of an executing component included in the kernel and an executing object included in a component included in the kernel.

12. The system of claim 7 wherein the event logging module further minimally causes the processor to store an event indicator in an event cache when the number of event indicators stored in the memory reaches a pre-established quantity.

13. A computer readable medium having imparted thereon one or more instruction sequences for managing the execution of a computer program including:

kernel that includes a kernel event description and further comprising one or more instruction sequences including:

scheduler that, when executed by a processor, minimally causes a processor to execute at least one of a user application, a component included in the kernel and an object included in a component included in the kernel;

event enable module that, when executed by a processor, minimally causes a processor to receive an event enable command by means of a command interface and further minimally causes a processor to enable a kernel event in the kernel with respect to a particular component of the kernel according to a received event enable command; and event logging module that, when executed by a processor, minimally causes a processor to log a description of the kernel event when the kernel event occurs and when the kernel event is enabled, wherein the event logging module causes a processor to enable a kernel event by minimally causing a processor to set a flag in an event status mask stored in a memory.

14. The computer readable medium of claim 13 wherein the kernel event description comprises at least one of an event description for a component included in the kernel or an event description for an object included in a component included in the kernel.

15. The computer readable medium of claim 14 wherein the kernel further comprises an expression evaluation module that, when executed by a processor, minimally causes a processor to evaluate an expression associated with an event and wherein the event logging module causes a processor to log an event by minimally causing the processor to:

determine an enable status of an event according to an event status mask stored in a memory; execute the expression evaluation module for an expression associated with an event when the event is enabled; and store an event indicator in the memory when the expression evaluates to a true value.

16. The computer readable medium of claim 15 wherein the event logging module causes a processor to store an indicator in the memory by minimally causing a processor to store an indicator in a circular buffer.

17. The computer readable medium of claim 15 wherein the event logging module, when executed by a processor, further minimally causes a processor to store in the memory a stack trace corresponding to at least one of an executing component included in the kernel and an executing object included in a component included in the kernel.

18. The computer readable medium of claim 13 wherein the event logging module further minimally causes the processor to cache an event indicator when the number of event indicators stored in the memory reaches a pre-established quantity.

19. A system for executing a computer program comprising:
  means for executing a computer program;
  means for describing an event in the means for executing the computer program with respect to a particular component included in the means for executing the computer program;
  means for enabling a described event in the means for executing the computer program while the means for executing a computer program is operating; and
  means for logging the described event when the described event is enabled and when the described event occurs;
  wherein the means for enabling a described event comprises:
    means for receiving an event enable command; and
    means for marking a described event as enabled according to a received event enable command.

20. A system for executing a computer program comprising:
  means for executing a computer program;
  means for describing an event in the means for executing the computer program with respect to a particular component included in the means for executing the computer program;
  means for enabling a described event in the means for executing the computer program while the means for executing a computer program is operating; and
  means for logging the described event when the described event is enabled and when the described event occurs, wherein the means for logging a described event comprises:
    means for evaluating an expression associated with a described event; and
    means for logging a described event when the expression evaluates to a true value and when the described event is enabled.

21. The system of claim 19 further comprising a means for logging an execution history when the described event is enabled and when the described event occurs.

* * * * *

UNITED STATES PATENT AND TRADEMARK OFFICE
CERTIFICATE OF CORRECTION

PATENT NO.         : 7,484,221 B2
APPLICATION NO.    : 10/970480
DATED              : January 27, 2009
INVENTOR(S)        : Jose German Rivera et al.

It is certified that error appears in the above-identified patent and that said Letters Patent is hereby corrected as shown below:

In column 8, line 46, in Claim 15, delete "claim 14" and insert -- claim 13 --, therefor.

Signed and Sealed this

Twenty-eighth Day of July, 2009

JOHN DOLL
*Acting Director of the United States Patent and Trademark Office*